United States Patent [19]

Cantor

[11] 4,031,068
[45] June 21, 1977

[54] NON-MIGRATORY SULFONYL AZIDE ANTIOXIDANTS

[75] Inventor: Stephen E. Cantor, Cheshire, Conn.

[73] Assignee: Uniroyal Inc., New York, N.Y.

[22] Filed: July 26, 1976

[21] Appl. No.: 708,676

[52] U.S. Cl. .................. 260/79.3 R; 260/45.9 NC; 260/45.85 A; 260/45.85 N; 260/349

[51] Int. Cl.² .................. C08K 5/43; C07C 117/00

[58] Field of Search ............. 260/45.9 NC, 79.3 R, 260/349, 769, 45.85 A, 45.85 N

[56] References Cited

UNITED STATES PATENTS

| | | | |
|---|---|---|---|
| 3,058,944 | 10/1962 | Breslow | 260/349 |
| 3,284,421 | 11/1966 | Breslow | 260/349 |
| 3,298,975 | 1/1967 | Feild et al. | 260/349 |
| 3,652,599 | 3/1972 | Sayigh et al. | 260/349 |
| 3,763,118 | 10/1973 | Ulrich et al. | 260/78.5 T |
| 3,859,261 | 1/1975 | Breslow | 260/349 |
| 3,991,131 | 11/1976 | Porter et al. | 260/349 |

OTHER PUBLICATIONS

Def. Publication No. T714,056 861 O.G. 368 Published Apr. 8, 1969 John N. Hall Class 161, Subclass 252.

*Primary Examiner*—V. P. Hoke
*Attorney, Agent, or Firm*—James J. Long

[57] ABSTRACT

Antioxidants containing a sulfonyl azide moiety react with polymers having carbon-hydrogen bonds thereby becoming non-extractable and non-migratory.

54 Claims, No Drawings

NON-MIGRATORY SULFONYL AZIDE ANTIOXIDANTS

This invention relates to antioxidants containing a sulfonyl azide moiety, and to a method of protecting polymers by reaction with said antioxidants, as well as to the protected polymers resulting from such method.

The usefulness of antioxidants in protecting polymers is often limited not by their chemical depletion, but by their physical loss either by extraction or volatility. It has been proposed to overcome this by reacting the antioxidant substance with the polymer so that it could not readily be extracted or volatilized. Two methods have been proposed to form chemical bonds between an antioxidant and a polymer. One is direct reaction of the antioxidant, or incipient antioxidant, with a reactive site on the polymer, for example by the opening of an epoxide group with an aromatic amine, or the reaction of a nitroso group with an available allylic hydrogen. However, this technique is not applicable with saturated polymers such as polyethylene or polypropylene. A second method involves the use of a polymerizable monomer which contains an antioxidant group. This type of compound is added in the original polymerization recipe and is incorporated along with the other monomers. The method is limited to polymers prepared via free-radical reactions and is not applicable to produce an EPDM, polyethylene or polypropylene with a bound antioxidant.

Described in this invention are new compositions of matter which, when subjected to elevated temperature of UV light, are, most surprisingly, capable of binding the antioxidant moiety directly to the polymer, provided the polymer contains available carbon-hydrogen bonds. This direct grafting technique relies on the unexpected ability of a "nitrene" species to insert into the carbon-hydrogen bond of the polymer. Polymers treated in this manner are remarkable for their ability to resist aging, even after solvent extraction.

The new antioxidants of the invention, which are suitable for reaction with polymers having available carbon-hydrogen bonds, are compounds containing a sulfonyl azide moiety and have the formula:

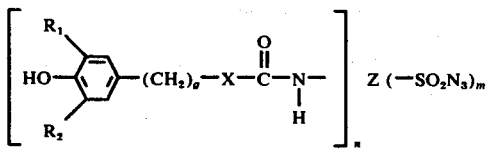

wherein:

$R_1$ is alkyl of from 1 to 12 carbon atoms (preferably 3 to 8 carbon atoms; especially tertiary alkyl), cyclohexyl, alkyl-cyclohexyl (e.g., $C_7$–$C_{10}$ alkylcyclohexl), benzyl or alkylbenzyl (e.g., $C_8$–$C_{11}$ alkylbenzyl);

$R_2$ is hydrogen or has one of the values assigned to $R_1$, with the proviso that $R_1$ and $R_2$ together have at least 2 carbon atoms;

g has a value from 0 to 5,

X is a divalent bridge member such as —CH$_2$O—, —CH$_2$NH—, or

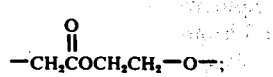

m and n are each 1 or 2; and Z is, depending on the values of m and n, a divalent, trivalent or tetravalent group selected from:

a. an alkylene group of from 2 to 5 carbon atoms when each of m and n is 1.
b. a divalent or trivalent benzene group when n is 1 and m is 1 of when m is 1 and n is 2, and
c. a divalent, trivalent or tetravalent group selected from naphthylene, diphenyl ether, and benzene groups when each of m and n is 1 or 2.

Although it is not desired to limit the invention to any particular theory of operation, it appears that the sulfonyl azide antioxidants of the above formula, when subjected to elevated temperature (as during the vulcanization of an elastomer or the molding of a thermoplastic containing such antioxidant) or ultraviolet light, generate a highly reactive species called a nitrene.

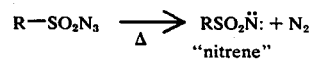

The nitrene is apparently capable of inserting into a carbon-hydrogen bond in the polymer:

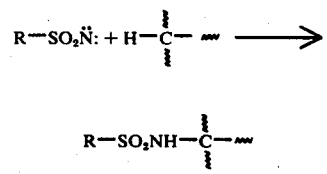

The antioxidant is thereby in effect grafted chemically to the polymer to form a reaction product from which the now non-migratory antioxidant cannot readily be extracted or volatilized, unlike conventional antioxidants which are merely physically mixed with the polymer.

The polymers which are protected against deterioration by reaction with the described sulfonyl azide antioxidants in accordance with the invention include all known polymers, having carbon-hydrogen bonds, that are normally subject to oxidative deterioration as by light and/or heat. These include natural and synthetic organic polymeric substances, whether elastomers or plastics, saturated or unsaturated. Mention may be made of the vinyl resins formed from the polymerization of vinyl halides (especially polyvinyl chloride) or from the copolymerization of vinyl halides with unsaturated polymerizable compounds, e.g., vinyl esters, alpha-beta unsaturated aldehydes, and unsaturated hydrocarbons such as butadiene and styrene; poly-alpha-olefins such as polyethylene, polypropylene, polyisobutylene, and the like, including copolymers of poly-alpha-olefinds; polyisoprene; polychloroprene; polychlorohydrin; copolymers of ethylene and propylene (EPM) or of ethylene, propylene and a non-conjugated diene such as 1,4-hexadiene, ethylidene norbornene, dicyclopentadiene or the like (EPDM); polybutadiene; butadiene-styrene copolymer; butadiene-acrylonitrile copolymer; polyurethanes such as those prepared from polyols and organic polyisocyanates; polyamides such as polyhexamethylene terephthalate; polycarbonates; polyacetals; polystyrene; polyethyleneoxide; and copolymers such as those high impact polystyrenes containing butadiene and styrene and polymers formed by graft copolymerization of styrene and acrylonitrile on polybutadiene or butadiene-styrene copolymer (ABS); also graft copolymers of styrene and acrylonitrile on EPM or EPDM; chlorinated rubber, natural rubber, reclaim rubber, butyl rubber, and the like. Other materials stabilized according to the present invention include lubricating oil of the aliphatic ester type, e.g., dihexyl azelate, di-(2-ethylhexyl)azelate, di(3,5,5-trimethylhexyl)glutarate, diisoamyl adipate, pentaerythritol, tetracaproate, triamyl tricarballate, dipropylene glycol dipelargonate, 1,5-pentanediol di-(2-ethylhexanoate), and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic, diesel oil, mineral oil, fuel oil, drying oil, cutting fluids, waxes, resins and the like, fatty acids such as soaps; trimethylolpropane tripelargonate, EPT rubber, chlorinated rubber, natural rubber and the like.

To prepare a sulfonyl azide antioxidant of the invention a p-isocyanatophenyl sulfonyl azide may first be prepared according to the following reaction:

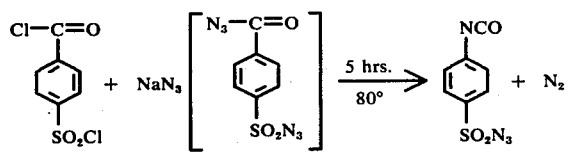

The isocyanate intermdiate may then be reacted with any antioxidant amine or alcohol to prepare a sulfonyl azide containing either a urea or a carbamate linkage:

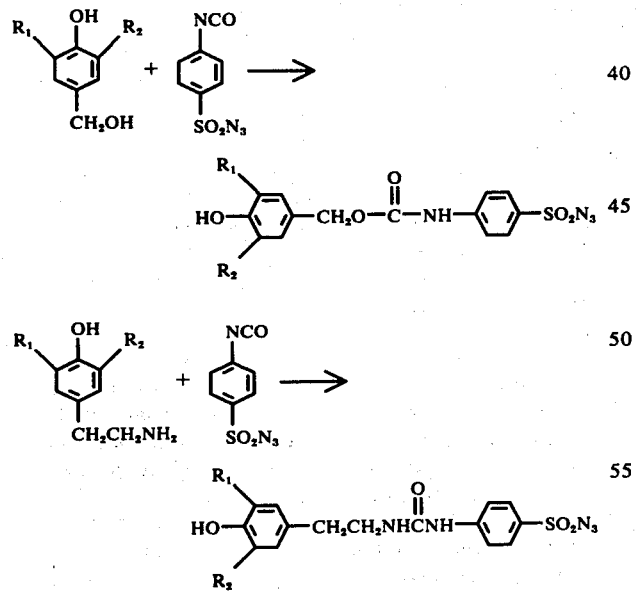

Another useful building block is 2-hydroxyethyl-4-azidosulfonyl carbonilate prepared from 4-isocyanatoabenzene sulfonyl chloride and ethylene glycol, followed by treatment with sodium azide. The hydroxyl function may be esterified with 3-(3,5-di-tert-butyl-4-hydroxyphenyl)propionyl chloride to produce an anti-oxidant sulfonyl azide containing both an ester and a carbamate linkage:

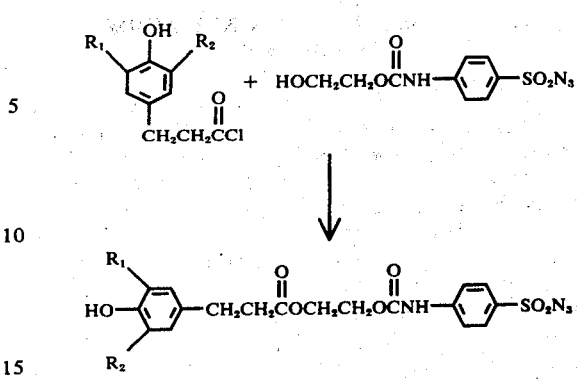

Care should be taken during the preparation and handling of sulfonyl azides. All sulfonyl azides liberate nitrogen on heating above approximately 125° and should not be distilled! However, sulfonyl azides containing sufficient number of carbon atoms (ca. 5 per azide group) are not shock sensitive. Preparations should be conducted behind shields and in small quantities. On an industrial scale, precautions such as are taken in handling dangerous materials should be observed.

Typical amines and acid chlorides which may be employed as building blocks to prepare antioxidants of the present invention are listed in U.S. Pat. No. 3,665,031, Peterii et al., May 23, 1972, at column 5, lines 36–54 and column 5, line 63 to column 6, line 15. Typical antioxidant alcohols which may be employed to prepare carbamate sulfonazide antioxidants of the present invention include those described in U.S. Pat. No. 3,763,287, Chiddis et al., Oct. 2, 1973, especially at column 3, line 5 to column 4, line 8.

Exemplary sulfonyl azide antioxidants of the invention include:

N-[(3,5-dimethyl-4-hydroxyphenyl)methyl]-N'-(4-azidosulfonylphenyl)urea

N-[(3-isopropyl-5-methyl-4-hydroxyphenyl)methyl]-N'-(4-azidosulfonylphenyl)urea

N-[(3-isopropyl-5-cyclohexyl-4-hydroxyphenyl)-methyl]-N'-(4-azidosulfonylphenyl)urea N-[(3-tert-butyl-5-benzyl-4-hydroxyphenyl)-methyl]-N'-(4-azidosulfonylphenyl)urea N-(3,5-di-tert-butyl-4-hydroxyphenyl)-N'-(4-azidosulfonylphenyl)urea N-(3-benzyl-5-methylcyclohexyl-4-hydroxyphenyl)-N'-(4-azidosulfonylphenyl)urea N-(3,5-di-sec-octyl-4-hydroxyphenyl)-N'-[4-(4'-azidosulfonylphenoxy)phenyl]urea N-(3,5-di-tert-butyl-4-hydroxyphenyl)-N'-(2-azidosulfonylfonylethyl)urea N-(3-octyl-5-benzyl-4-hydroxyphenyl)-N'-[1-(5-azidosulfonyl)naphthyl]urea N-(3,5-di-tert-amyl-4-hydroxyphenyl)-N'-[4-(4'-azidosulfonylphenoxy)phenyl]urea N-[(5,5-dibenzyl-4-hydroxyphenyl)methyl]-N'-(4-azidosulfonylphenyl)urea N-[(3-dodecyl-5-methylcyclohexyl-4-hydroxyphenyl)-methyl]-N'-(4-azidosulfonylphenyl)urea N-[(3,5-di-tert-butyl-4-hydroxyphenyl)methyl]-N'-(4-azidosulfonylphenyl)urea N-[2-(3-ethyl-5-isopropyl-4-hydroxyphenyl)-ethyl]-N'(4-azidosulfonylphenyl)urea N-[2-(3,5-di-sec-octyl-4-hydroxyphenyl)ethyl]-N'-(4-azidosulfonylphenyl)urea
N-[2-(3-tert-butyl-5-propylcyclohexyl-4-hydroxyphenyl)ethyl]-N'-(4-azidosulfonylphenyl)urea
N-[2-(3-benzyl-5-decyl-4-hydroxyphenyl)ethyl]-N'-(4-azidosulfonylphenyl)urea
N-[3-(3,5-dimethyl-4-hydroxyphenyl)propyl]-N'-(4-azidosulfonylphenyl)urea
N-[3-(3-tert-butyl-5-octyl-4-hydroxyphenyl)-propyl]-N'-(4-azidosulfonylphenyl)urea
N-[3-(3,5-di-tert-butyl-4-hydroxyphenyl)propyl]-N'-(4-azidosulfonylphenyl)urea
N-[3-(3-cyclohexyl-5-benzyl-4-hydroxyphenyl)-propyl]-N'-(4-azidosulfonylphenyl)urea
N-[4-(3-octyl-5-nonyl-4-hydroxyphenyl)butyl]-N'-(4-azidosulfonylphenyl)urea
N-[4-(3-benzyl-5-isopropyl-4-hydroxyphenyl)-butyl]-N'-(4-azidosulfonylphenyl)urea
N-[4-(3,5-di-tert-butyl-4-hydroxyphenyl)butyl]-N-(4-azidosulfonylphenyl)urea
N-[4-(3-propyl-5-ethylcyclohexyl-4-hydroxyphenyl)-butyl]-N')4-azidosulfonylphenyl)urea
N-[(3,5-di-tert-butyl-4-hydroxyphenyl)methyl]-N'-[4-(4'-azidoslfonylphenoxy)phenyl] urea -azidosulfonylphenoxy)phenyl]
N-[)3-cyclohexyl-5-pentyl-4-hydroxyphenyl)methyl]-N'-[4-(4'-azidosulfonylphenoxy)phenyl]urea
N-[(3,5-dibenzyl-4-hydroxyphenyl)methyl]-N'-[4-(4'-azidosulfonylphenoxy)phenyl]urea
N-[2-(3,5-di-sec-octyl-4-hydroxyphenyl)ethyl]-N'-[4-(4'-azidosulfonylphenoxy)phenyl]urea
N-[2-(3-isopropyl-5-benzyl-4-hydroxyphenyl)-ethyl]-N'-[4-(4'-azidosulfonylphenoxy)phenyl]urea
N-[2-(3-propyl-5-dodecyl-4-hydroxyphenyl)-ethyl]-N'-[4-(4'-azidosulfonylphenoxy)phenyl]urea
N-[3-(3,5-diisobutyl-4-hydroxyphenyl)propyl]-N'-[4-(4'-azidosulfonylphenoxy)phenyl]urea
N'[3-(3-benzyl-5-tert-butyl-4-hydroxyphenyl)-propyl]-N'-[4-(4'-azidosulfonylphenoxy)phenyl]urea
N-[4-(3-ethyl-5-octyl-4-hydroxyphenyl)butyl]-N'-[4-(4'-azidosulfonylphenoxy)phenyl]urea
N-[(3-hexyl-5-isopropyl-4-hydroxyphenyl)methyl]-N'-[1-(5-azidosulfonyl)naphthyl]urea
N-[(3,5-dibenzyl-4-hydroxyphenyl)methyl]-N'-[1-(5-azidosulfonyl)naphthyl]urea
N-[2-(3-octyl-5-tert-butyl-4-hydroxyphenyl)-ethyl]-N'-[1-(5-azidosulfonyl)naphthyl]urea
N-[(3-(3,5-diisopropyl-4-hydroxyphenyl)propyl]-N'-[1-(5-azidosulfonyl)naphthyl]urea
N-[(3,5-diisopropyl-4-hydroxyphenyl)methyl]-N'-(2-azidosulfonylethyl)urea
N-[(3-benzyl-5-nonyl-4-hydroxyphenyl)methyl]-N'-(2-azidosulfonylethyl)urea
N-[2-(3,5-di-tert-butyl-4-hydroxyphenyl)ethyl]-N'-(2-azidosulfonylethyl)urea
N-[3-(3-octyl-5-benzyl-4-hydroxyphenyl)propyl]-N'-(3-azidosulfonylpropyl)urea
N-[3-(3,5-diisopropyl-4-hydroxyphenyl)propyl]-N'-(3-azidosulfonylpropyl)urea
N-[(3-methyl-5-dodecyl-4-hydroxyphenyl)methyl]-N'-(5-azidosulfonylpentyl)urea
N-[3,5-diisoamyl-4-hydroxyphenyl)methyl]-N'-(5-azidosulfonylpentyl)urea
N-[2-(3,5-di-tert-butyl-4-hydroxyphenyl)ethyl]-N'-(3-azidosulfonylpropyl)urea
N-[4-(3-octyl-5-benzyl-4-hydroxyphenyl)butyl]-N'-(2-azidosulfonylethyl)urea
N-(3,5-diisoamyl-4-hydroxyphenyl)-N'-(2,5-diazidosulfonylphenyl)urea
N-(3-propyl-5-benzyl-4-hydroxyphenyl)-N'-(2,5-diazidosulfonylphenyl)urea
N-(3-di-tert-butyl-4-hydroxyphenyl)-N'-(3,6-diazidosulfonylnaphthyl)urea
N-(3-octyl-5-sec-butyl-4-hydroxyphenyl)-N'-(4,5-diazidosulfonylpentanyl)urea
4-(azidosulfonyl)-N,N'-bis(3,5-di-tert-butyl-4-hydroxyphenylcarbamyl)-1,3-phenylenediamine
4-(azidosulfonyl)-N,N'-(3-benzyl-5-octyl-4-hydroxyphenylcarbamyl)-1,3-phenylenediamine
2'-(azidosulfonyl)-N,N'-bis(3,5-dicyclohexyl-4-hydroxyphenylcarbamyl)-4,4'-diphenylether
(3,5-di-bert-butyl-4-hydroxy)benzyl-N-2-(azidosulfonyl)ethylcarbamate
(3-benzyl-5-sec-octyl-4-hydroxy)benzyl-N-3-(azidosulfonyl)propylcarbamate
(3-dodecyl-5-cyclohexyl-4-hydroxy)benzyl-N-4-(azidosulfonyl)phenylcarbamate
(3-isopropyl-5-butyl-4-hydroxy)benzyl-N-[1-(5-azidosulfonyl)naphthyl]carbamate.
2-(3,5-diisopropyl-4-hydroxyphenyl)ethyl-N-2-(azidosulfonyl ethylcarbamate
2(3-benzyl-5-methylcyclohexyl-4-hydroxyphenyl)-N-3-(azidosulfonyl)propylcarbamate
2-(3,5-di-tert-butyl-4-hydroxyphenyl)ethyl-N-4-(azidosulfonyl)phenylcarbamate
4-(3,5-di-sec-butyl-4-hydroxyphenyl)butyl-N-4-(azidosulfonyl)butylcarbamate
3,5-dibenzyl-4-hydroxybenzyl-4-azidosulfonylcarbanilate
3-octyl-5-dodecyl-4-hydroxybenzyl-4-azidosulfonylcarbanilate
3-isopropyl-5-methylcyclohexyl-4-hydroxybenzyl-N-[2,5-(azidosulfonyl)naphthylcarbamte]
4-(azidosulfonyl)-N,N'-bis(3,5-di-tert-butyl-4-benzylcarbamate)-1,3-phenylenediamine
4-(3,5-di-sec-octyl-4-hydroxyphenyl)butyl-N-2-(azidosulfonyl)ethylcarbamate
3-(3-methyl-5-hexyl-4-hydroxyphenyl)propyl-N-3-(azidosulfonyl)propylcarbamate
2-(3-tert-butyl-5-methyl-4-hydroxybenzoxy)ethyl-N-(2-azidosulfonyl)ethylcarbamate
2-(3,5-didodecyl-4-hydroxybenzoxy)ethyl-N-(3-azidosulfonyl)propylcarbamate
2-(3,5-di-tert-butyl-4-hydroxyacetoxy)ethyl-N-(4-azidosulfonyl)butylcarbamate
2-(3-methylcyclohexyl-5-isopropyl-4-hydroxypropoxy)ethyl-N-(2-azidosulfonyl)ethylcarbamate
2-(3,5-di-tert-amyl-4-hydroxybenzoxy)ethyl-4-azidosulfonylcarbanilate
2-(3,5-dibenzyl-4-hydroxybenzoxy)ethyl-4-azidosulfonylcarbanilate
2-(3-methyl-5-dodecyl-4-hydroxybenzoxy)ethyl-4-azidosulfonylcarbanilate
2-(3,5-di-tert-butyl-4-hydroxypropoxy)ethyl-4-azidosulfonylcarbanilate
2-(3-isoamyl-5-methylcyclohexyl-4-hydroxyacetoxy)ethyl-4-azidosulfonylcarbanilate
2-(3,5-dicyclohexyl-4-hydroxybenzoxy)ethyl-2,4-diazidosulfonylcarbanilate
2-(3,5-di-sec-butyl-4-hydroxyphenoxy)ethyl-N-4[(4'-azidosulfonylphenoxy)phenyl]carbamate
2(3-isopropyl-5-methylcyclohexyl-4-hydroxy-acetoxy)ethyl-N-[1-(5-azidosulfonyl)naphthyl]carbamate, and the like.

It will be understood that the present sulfonyl azide antioxidats may be mixed with the polymer to be protected against oxidative deterioration in conventional antioxidant amounts. Heating of the mixture, or exposure of the mixture to ultraviolet radiation, brings about reaction between the antioxidant and the polymer, as described. The heating to which a vulcanizable of thermosetting composition is normally subjected in the course of vulcanization of cure is more than sufficient to bring about the reaction, as is the heating to which thermoplastic resins are normally subjected in the course of a shaping operation, such as molding. Usually a temperature of about 125° C. is sufficient to convert the antioxidant to the reactive nitrene, but the mixture may of course be subjected to higher temperatures as long as they are not injurious to the particular polymer composition. The reaction takes place readily within the time periods normally required fo vulcanizing or molding a polymer.

The following examples will serve to illustrate the practice of the invention in more detail. The known starting material, p-azidosulfonyl isocyanate, may be prepared from p-chlorosulfonylbenzoyl chloride and sodium azide according to conventional procedure (70% yield, mp 37°–39°); it should be stored in a tightly sealed vessel to protect the isocyanate function from moisture. All temperatures are expressed herein in degrees Centigrade, unless otherwise indicated; all parts and percentages are expressed by weight unless otherwise indicated.

EXAMPLE 1

N-[2-(3,5-Di-tert-butyl-4-hydroxyphenyl)ethyl]N'-(4-azidoslfonylphenyl)urea (DTBSU).

In a 500 ml three-necked flask, fitted with a thermometer, stirrer and drying tube, are placed 11.2 g (0.05 mole) of p-azidosulfonylphenyl isocyanate and 200 ml of dry acetonitrile. The flask is maintained at 20°–25°, 12.4 g (0.055 mole) of 2-(3,5-di-tert-butyl-4-hydroxyphenyl)ethyl amine dissolved in 200 ml acetonitrile is added slowly. After 2 hours of stirring at room temperature examination of an aliquot via infrared spectrophotometer indicates complete loss of the isocyanate function. The acetonitrile is removed via rotary evaporator and the remaining material poured into ice to precipitate the product in an 87% yield, mp 122°–127°. Nitrogen evolved at 140°–150°.

For purposes of comparison, N-[2-(3,5-di-tert-butyl-4-hydroxyphenyl)-ethyl]-N'-phenylurea (DTBU), which is a structure containing no sulfonylazide moiety and is outside the invention may be prepared in similar equipment, as described above. For this purpose 12.5 g (0.056 mole) of 2-(3,5-di-tert-butyl-4-hydroxyphenyl-)ethyl amine is dissolved in 400 ml of acetonitrile and treated with 5.9 g (0.050 1 mole) of phenyl isocyanate. The resulting precipitate is collected and dried to yield 14 g (75%) mp 188°–191°; infra-red spectrum contains bands for urea, NH (3450 cm$^{-1}$) but no evidence of isocyanate.

EXAMPLE 2

3,5-Di-tert-butyl-4-hydroxybenzyl-4-azidosulfonylcarbanilate (DTBSC).

4.28 g (0.02 mole) of 3,5-di-tert-butyl-4-hydroxybenzyl alcohol (Ethyl 754; trademark) is dissolved in 75 ml of acetonitrile and added to 4.48 g (0.02 mole) of p-azidosulfonyl phenyl isocyanate dissolved in 100 ml of acetonitrile. After 2 hours of stirring at room temperature all of the isocyanate is consumed. The excess solvent is removed in vacuo, the remaining oil is poured into ice water. The solid product is obtained in 78% yield, mp 130°–133° with loss of nitrogen and decomposition at 175°.

EXAMPLE 3

2-[3-(3,5Di-tert-butyl-4-hydroxyphenyl)propionoxy]-ethyl-4-azidosulfonylcarbanilate (DTBSC).

In a 500 ml flat-bottom flask are placed 20 g (0.7 mole) of 3-(3,4-di-tert-butyl-4-hydroxyphenyl)propionyl-chloride and 200 ml of dry DMF (dimethyl formamide) containing a few drops of pyridine. The solution is stirred at room temperature as 21 g (0.7 mole) of 2-hydroxyethyl-4-azidosulfonyl carbanilate dissolved in 150 ml of DMF is added. After stirring at room temperature the DMF solution is poured into ice water, the solid is collected and dried to yield 22 g (58%) mp 70°–75°. Decomposition at 175° with evolution of nitrogen.

EXAMPLE 4

This example illustrates the use of novel sulfonyl azide antioxidants of the invention in various plastics and rubbers, as follows:

Polyethylene plastic Hi Fax (trademark), melt flow index 4.0, density 0.96.

Polypropylene plastic Profax (trademark) 6523, melt flow index 4.0, density 0.96.

EPDM terpolymer rubber; ethylene:propylene weight ratio 57:43; termonomer ethylidene norbornene; iodine number 20; Mooney viscosity 52 Ml-4 at 257° F.

Natural rubber; SMR-5.

NBR copolymer rubber; 39.5% acrylonitrile; Mooney viscosity 65 ML-4 at 212° F.

The antioxidant is incorporated in the polyethylene and the polypropylene by treating polyethylene and polypropylene powder with a 0.5% by weight solution of the test antioxidant in tetrahydrofuran. The solvent is removed at reduced pressure and then films are molded at 330° F. for 15 minutes. During this molding, the antioxidant of the invention becomes bound to the plastic.

To incorporate the antioxidant in the EPDM elastomer, the elastomer is dissolved in benzene and 1% by weight of the text antioxidant is added, followed by removal of the solvent. The gum elastomer is molded at 320° F. for 10 minutes, during which time the antioxidant of the invention becomes grafted to the elastomer.

The natural rubber test compositions are prepared by mixing the following ingredients (amounts expressed in parts by weight): SMR-5 100, N-330 (trademark) HAF carbon black 45, zinc oxide 5, stearic acid 2, Delac NS (trademark; N-t-butyl-2-benzothiazole sulfenamide) 1.0, diphenyl guanidine 0.3, sulfur 2.0, test antioxidant 2.0. A laboratory mixer (Braebender-Plasticord; trademark) is used to mix the ingredients except the curatives and antioxidant, which are added on a small laboratory mill. The stock is cured in a mold at 310° F. for 20 minutes, during which the antioxidant of the invention reacts with the rubber.

The NBR test compositions are prepared in the same manner as the natural rubber compositions, using the following recipe: NBR 100, N-744 (trademark) SRF carbon black 70, zinc oxide 5, stearic acid 1, tetramethyl thiuram monosulfide 0.2, Delac S (trademark;

N-cyclohexyl-2-benzothiazole sulfenamide) 1.0, sulfur 2.0, test bantioxidant 2.0. The stock is cured 20 minutes at 310° F., bringing about reaction between the antioxidant of the invention and the NBR.

Table I shows the results of oxygen absorption tests (a measure of the effectiveness of the antioxidant) on EPDM, polypropylene and polyethylene samples prepared as described, containing antioxidants of the invention as shown in the table, viz, DTBSU (the product of Example 1), DTBSC (the product of Example 2) and DTBDSC (the Example 3 product). For comparison the tests include samples in which two commercially available conventional stabilizers are used, namely Irganox 1076 (trademark; n-octadecyl-3-(3′,5′-di-tert-butyl-4′-hydroxyphenyl)propionate) and Ethyl 754 (trademark; 3,5-di-tert-butyl-4-hydroxybenzyl alcohol). The oxygen absorption is measured at 150° under pure oxygen. The time in minutes required to absorb 20 cc of oxygen per gram of polymer is noted in Table I. The oxygen absorption test is also conducted on samples which have been subjected to extraction with an organic solvent. The extraction procedure involves continously extracting thin sheets of the material with an azeotropic mixture of methanol/acetone/chloroform (28:35:29 ml, bp 57.5°) in a Soxhlet apparatus for 24 hours, followed by drying in vacuo. Table I shows the oxygen absorption results on the various samples, both without extraction and after the extraction treatment. The results show that the sulfonyl azide antioxidants of the invention give good protection against oxygen (long time to absorb oxygen), equivalent to the commercial antioxidants, prior to extraction. However, after solvent extraction, the sulfonyl azide stabilizers of the invention are vastly superior to the commercial materials. This is believed to be due to the fact that the sulfonyl azide antioxidant of the invention, being network-bound chemically to the polymer, is not removed from the polymer by the solvent extraction, whereas the conventional stabilizers tend to be removed, leaving the polymer with reduced protection. With EPDM, DTBSU antioxidant of the invention is seven times more efficient than Irganox 1076 after solvent extraction. This effect is noted again in the protection afforded to both polyethylene and polypropylene by the sulfonyl azide antioxidants.

Table I

| $O_2$ Absorption of Polymers at 150° C. | | | |
|---|---|---|---|
| Polymer | Added Stabilizer | Minutes to 20 cc. of $O_2$/gram of polymer | |
| | | Unextracted | Extracted |
| DPDM | DTBSU | 1212 | 355 |
| | DTBSC | 744 | 105 |
| | DTBPSC | 986 | 135 |
| | Irganox 1076 | 900 | 48 |
| Polypropylene | DTBSU | 6930 | 850 |
| | Ethyl 754 | 4050 | 177 |
| Polyethylene | DTBSU | 720 | 720 |
| | Ethyl 754 | 947 | 157 |

In Table II results are reported on physical tests performed on the above-described NBR vulcanizates according to standard ASTM procedures. The tensile strength is expressed in pounds per square inch and the elongation is expressed as percent elongation is expressed as percent elongation at break. Tensile specimens of the vulcanizates are cut to shape by a DeMattia die. The tests are performed in the original sample and repeated on samples aged 96 hours at 70° in an oxygen bomb. These tests are repeated on tensile specimens subjected to the previously described extracton procedure. Table II shows the results in NBR vulcanizates using the sulfonyl azide antioxidant of the invention DTBSU (Example 1 product), and for comparison, the commercial material Irganox 1076, as well as the material DTBU, N-[2-(3,5-di-tert-butyl-4-hydroxyphenyl)-ethyl]-N′-phenylurea, prepared as described above, a structure which contains no sulfonazide moiety and is therefore outside the invention. It will be noted from Table II that the NBR vulcanizate of the invention containing the network-bound DTBSU antioxidant displays a marked degree of retention of physical properties after solvent extraction. The conventional antioxidant Irganox used for comparison is removed by the extraction process and therefore affords no protection; thus this sample is too brittle to test. Similarly, in the control experiment in Table II using the DTBU material containing no sulfonazide moiety, it can be seen that this material is satisfactory until it is subjected to extraction, then it is removed and affords no protection for the elastomer.

Table II

| Non-Migrating vs. Conventional Anti-Oxidant in NBR Vulcanizate | | | | |
|---|---|---|---|---|
| | DTBSU | | | |
| | Unextracted | | Extracted | |
| | Original | Aged | Original | Aged |
| Tensile | 2830 | 2700 | 1800 | 2210 |
| Elong. | 250 | 210 | 180 | 130 |
| Shore A | 78 | 80 | 72 | 75 |
| | Irganox 1076 | | | |
| Tensile | 2710 | 2880 | 1720 | Too brittle |
| Elong. | 210 | 220 | 160 | to test |
| Shore A | 78 | 80 | 75 | |
| | DTBU | | | |
| Tensile | 3010 | 2780 | 2500 | Brittle |
| Elong. | 290 | 230 | 230 | |
| Shore A | 81 | 83 | 78 | |

Table III summarizes the results of a similar series of tests on the above-described NR vulcanizate. The aging is conducted in the oxygen bomb for 24 hours at 70°. The control stocks include one in which the conventional antioxidant PBNA (N-phenyl-beta-naphthylamine) is used, as well as one in which the non-sulfonazide material DTBU is employed. Again, the DTBSU antioxidant of the invention displays its superiority by remaining effective even after the extraction procedure, as evidenced by retention of physical properties after aging, whereas the PBNA and DTBU NR vulcanizates become brittle when aged after extraction.

Table III

| Non-Migrating vs. Conventional Anti-Oxidant in NR Vulcanizate | | | | |
|---|---|---|---|---|
| | DTBSU | | | |
| | Unextracted | | Extracted | |
| | Original | Aged | Original | Aged |
| Tensile | 3240 | 1960 | 2980 | 2800 |
| Elong. | 400 | 330 | 270 | 280 |
| Shore A | 65 | 71 | 74 | 76 |
| | PBNA | | | |
| Tensile | 3560 | 2170 | 2370 | Too brittle |
| Elong. | 470 | 380 | 310 | to Test |
| Shore A | 61 | 65 | 67 | |
| | DTBU | | | |
| Tensile | 3770 | 2500 | 3710 | |
| Elong. | 450 | 390 | 410 | Brittle |
| Shore A | 68 | 68 | 68 | |

I claim:
1. A sulfonyl azide antioxidant of the formula

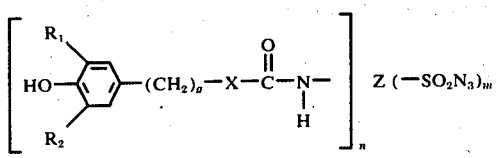

wherein:
R₁ is alkyl of from 1 to 12 carbon atoms, cyclohexyl, $C_1$–$C_{10}$ alkyl-cyclohexyl, benzyl, or $C_8$–$C_{11}$ alkyl-benzyl;
R₂ is hydrogen or has one of the values assigned to R₁, with the proviso that R₁ and R₂ together have at least 2 carbon atoms;
g has a value of from 0 to 5;
X is a divalent bridge member selected from —CH₂O—, —CH₂NH—, or

m and n are each 1 or 2; and
Z is, depending on the values of m and n, a divalent, trivalent or tetravalent group selected from:
a. an alkylene group of from 2 to 5 carbon atoms when each of m and n is 1,
b. a divalent or trivalent benzene group when n is 1 and m is 1 or when m is 1 and n is 2, and
c. a divalent, trivalent or tetravalent group selected from naphthylene, diphenyl ether, and benzene groups when each of m and n is 1 or 2.

2. An antioxidant as in claim 1 in which R₁ is alkyl.
3. An antioxidant as in claim 1 in which R₂ is alkyl.
4. An antioxidant as in claim 1 in which R₁ and R₂ are alkyl having 3 to 8 carbon atoms.
5. An antioxidant as in claim 1 in which R₁ and R₂ are C₄ alkyl.
6. An antioxidant as in claim 1 in which R₁ and R₂ are tertiary alkyl.
7. An antioxidant as in claim 1 in which R₁ and R₂ are tertiary butyl.
8. An antioxidant as in claim 1 in which g is zero.
9. An antioxidant as in claim 1 in which g is 1.
10. An antioxidant as in claim 1 in which X is —CH₂O—.
11. An antioxidant as in claim 1 in which X is —CH₂NH—.
12. An antioxidant as in claim 1 in which X is

13. An antioxidant as in claim 1 in which n is 1.
14. An antioxidant as in claim 1 in which m is 1.
15. An antioxidant as in claim 1 in which n and m are 1.
16. An antioxidant as in claim 1 in which Z is phenylene.
17. The antioxidant of claim 1 which is N-[2-(3,5-di-tert-butyl-4-hydroxyphenyl)ethyl]-N'-(4-azidosulfonyl)urea.
18. The antioxidant of claim 1 which is 3,5-di-tert-butyl-4-hydroxybenzyl-4-azidosulfonylcarbanilate.
19. The antioxidant of claim 1 which is 2-[3-(3,5-di-tert-butyl-4-hydroxyphenyl)propionoxy]ethyl-4-azidosulfonylcarbanilate.
20. A method of protecting from oxidative deterioration a polymer, normally subject to oxidative deterioration, said polymer having a carbon-hydrogen bond, comprising mixing with the said polymer, in an amount effective to protect said polymer against oxidative deterioration, an antioxidant as in claim 1.
21. A method as in claim 20 in which the resulting mixture of polymer and antioxidant is subjected to elevated temperature whereby the antioxidant is chemically bound to the polymer at the said carbon-hydrogen bond and said antioxidant resists extraction from the polymer by organic solvents that normally dissolve the antioxidant.
22. A method as in claim 20 in which R₁ and R₂ are alkyl having 3 to 8 carbon atoms.
23. A method as in claim 22 in which R₁ and R₂ are tertiary alkyl.
24. A method as in claim 23 in which R₁ and R₂ are tertiary butyl.
25. A method as in claim 20 in which X is —CH₂O—.
26. A method as in claim 20 in which X is —CH₂NH—.
27. A method as in claim 20 in which X is

28. A method as in claim 20 in which the said antioxidant is N-[2-(3,5-di-tert-butyl-4-hydroxyphenyl)ethyl]-N'-(4-azidosulfonylphenyl)urea.
29. A method as in claim 20 in which the said antioxidant is 3,5-di-tert-butyl-4-hydroxybenzyl-4-azidosulfonylcarbanilate.
30. A method as in claim 20 in which the said antioxidant is 2-[3-(3,5-di-tert-butyl-4-hydroxyphenyl)propionoxy]ethyl-4-azidosulfonylcarbanilate.
31. A method as in claim 21 in which the said polymer is a vulcanizable elastomeric composition, and the said heating occurs during vulcanization of the elastomer.
32. A method as in claim 31 in which the said elastomer is an ethylene-propylene-non-conjugated diene terpolymer.
33. A method as in claim 31 in which the said elastomer is butadiene-acrylonitrile copolymer.
34. A method as in claim 31 in which the said elastomer is natural rubber.
35. A method as in claim 21 in which the said polymer is a thermoplastic resin and the said heating occurs shaping of the said thermoplastic.
36. A method as in claim 35 in which the said thermoplastic is polyethylene.
37. A method as in claim 35 in which the said thermoplastic is polypropylene.
38. The product of the method of claim 21.
39. The product of the method of claim 22.
40. The product of the method of claim 23.
41. The product of the method of claim 24.
42. The product of the method of claim 25.
43. The product of the method of claim 26.
44. The product of the method of claim 27.
45. The product of the method of claim 28.
46. The product of the method of claim 29.
47. The product of the method of claim 30.
48. The product of the method of claim 31.
49. The product of the method of claim 32.
50. The product of the method of claim 33.
51. The product of the method of claim 34.
52. The product of the method of claim 35.
53. The product of the method of claim 36.
54. The product of the method of claim 37.

* * * * *

UNITED STATES PATENT AND TRADEMARK OFFICE
CERTIFICATE OF CORRECTION

PATENT NO. : 4,031,068
DATED : June 21, 1977
INVENTOR(S) : Stephen E. Cantor

It is certified that error appears in the above—identified patent and that said Letters Patent are hereby corrected as shown below:

Col. 11, line 11, for "$C_1$" read -- $C_7$ --; line 60, for "fonyl" read -- fonylphenyl --.

Signed and Sealed this

Thirteenth Day of December 1977

[SEAL]

Attest:

RUTH C. MASON
Attesting Officer

LUTRELLE F. PARKER
Acting Commissioner of Patents and Trademarks